United States Patent [19]
Ohmura et al.

[11] Patent Number: 5,007,494
[45] Date of Patent: Apr. 16, 1991

[54] REAR WHEEL TURNING SYSTEM

[75] Inventors: Hiroshi Ohmura; Satoru Tanabe; Junji Yoshioka; Hirotaka Kanazawa, all of Hiroshima, Japan

[73] Assignee: Mazda Motor Corporation, Hiroshima, Japan

[21] Appl. No.: 358,020

[22] Filed: May 30, 1989

[30] Foreign Application Priority Data

May 30, 1988 [JP] Japan .................................. 63-132260
Nov. 18, 1988 [JP] Japan .................................. 63-292187

[51] Int. Cl.⁵ .............................................. B62D 5/04
[52] U.S. Cl. .................................... 180/79.1; 280/91; 192/48.2
[58] Field of Search ................. 180/791, 140, 142; 280/91; 192/48.2, 84 AA

[56] References Cited

U.S. PATENT DOCUMENTS

| | | | |
|---|---|---|---|
| 2,279,986 | 4/1942 | Griswald | 192/48.2 |
| 4,724,916 | 2/1988 | Morishita et al. | 180/79.1 |
| 4,735,271 | 4/1988 | Shimizu | 180/79.1 |
| 4,782,907 | 11/1988 | Morishita et al. | 180/140 |
| 4,854,410 | 8/1989 | Kanazawa et al. | 180/142 X |
| 4,893,688 | 1/1990 | Morishita | 180/79.1 |

FOREIGN PATENT DOCUMENTS

| | | |
|---|---|---|
| 0225773 | 6/1987 | European Pat. Off. . |
| 0243180 | 10/1987 | European Pat. Off. . |
| 0289039 | 11/1988 | European Pat. Off. . |
| 0292567 | 11/1988 | European Pat. Off. . |
| 2610275 | 8/1988 | France . |

Primary Examiner—Charles A. Marmor
Assistant Examiner—Mitchell Bompey
Attorney, Agent, or Firm—Sixbey, Friedman, Leedom & Ferguson

[57] ABSTRACT

A rear wheel turning mechanism in a four wheel steering system includes a rear wheel turning rod which is connected to the rear wheels of the vehicle and is adapted such that it can be displaced and thereby turn the rear wheels. An electric motor is operatively connected to the rear wheel turning rod and the steering wheel and displaces the rear wheel turning rod, thereby causing the rear wheels to turn in response to operation of the steering wheel. A rear-wheel-neutralizing spring urges the rear wheel turning rod to the neutral position in which the rear wheels are held in the straight-ahead position. A pair of clutches are interposed in series between the electric motor and the rear wheel turning rod and are adapted such that they disconnect the latter from the former, which permits the latter to return to the neutral position under the force of the rear-wheel-neutralizing spring.

10 Claims, 9 Drawing Sheets

REAR WHEEL TURNING SYSTEM

BACKGROUND OF THE INVENTION

1. Field of the Invention

This invention relates to a rear wheel turning system for turning the rear wheels of a vehicle in response to the operation of a steering wheel.

2. Description of the Prior Art

There has been known a four-wheel steering system for a vehicle in which not only the front wheels but also the rear wheels are turned in response to the operation of the steering wheel.

A four wheel steering system generally comprises a front wheel turning mechanism for turning the front wheels and a rear wheel turning mechanism for turning the rear wheels which are mechanically or electrically connected to each other. In a four wheel steering system of the latter type, the rear wheel turning mechanism is driven by an electric motor which is operatively connected to the steering wheel as disclosed in U.S. Pat. No. 4,645,025.

As disclosed in the United States patent, it has been proposed to provide the rear wheel turning mechanism with a rear-wheel-neutralizing means which normally urges the rear wheel turning mechanism into the neutral position in which it holds the rear wheels in a straight-ahead position. The rear-wheel-neutralizing means functions as a fail-safe mechanism which returns the rear wheels to the straight-ahead position and holds them there in case the control system fails.

For such motor-driven rear wheel turning mechanisms, a motor brake is generally provided for the electric motor in order to enhance the holding torque, and a reduction train is generally interposed between the electric motor and the rear wheel turning mechanism in order to allow a smaller electric motor to be used. Accordingly, in order to return the rear wheels to the straight-ahead position, the rear-wheel-neutralizing means must overcome the holding torque of the electric motor which is transmitted thereto by way of the reduction train, and therefore, it is very difficult for the rear-wheel-neutralizing means to actually return the rear wheels to the straight-ahead position and hold them there. This problem may be overcome by the use of a clutch which is interposed between the electric motor and the rear wheel turning means and is adapted in such a way that it disconnects the latter from the former and permits the latter to return to the neutral position under the force of the rear-wheel-neutralizing means. However, if the clutch fails or jams, or the circuit for energizing the clutch is broken, the clutch cannot be disengaged, and accordingly, the rear wheels cannot be correctly returned to the straight-ahead position.

SUMMARY OF THE INVENTION

In view of the foregoing observations and description, the primary object of the present invention is to provide a rear wheel turning system which can return the rear wheels to the straight-ahead position with a degree of certainty yielding a satisfactory reliability in case the rear-wheel turning system fails.

The rear wheel turning system in accordance with the present invention comprises a rear wheel turning means which is connected to the rear wheels of the vehicle and turns the rear wheels, an electric motor which is operatively connected to the rear wheel turning means by way of a driving force transmitting system and to the steering wheel and displaces the rear wheel turning means, thereby turning the rear wheels in response to the operation of the steering wheel, a rear-wheel-neutralizing means which urges the rear wheel turning means to the neutral position in which the rear wheels are held in a straight-ahead position, and a pair of clutches which are provided in series in the driving force transmitting system between the electric motor and the rear wheel turning means and are adapted such that they disconnect the latter from the former, which permits the latter to return to the neutral position under the force of the rear-wheel-neutralizing means.

As the clutches, electro-magnetic clutches are conveniently used. When such electro-magnetic clutches are used, it is preferable for one of the clutches to be a normally-closed type, which is normally engaged and is disengaged when it is energized, and the other clutch to be a normally-open type, which is normally disengaged and is engaged when it is energized.

When a pair of clutches are provided in the driving force transmitting system, the rear wheel turning means can be disconnected from the electric motor even if one of the clutches is unable to disengage, whereby the rear wheels can be returned to the straight-ahead position with a higher reliability in case the rear-wheel turning system fails. Further, when one of the clutches is a normally-closed type of electro-magnetic clutch and the other clutch is a normally-open type of electromagnetic clutch, the reliability of the system can be further improved, and at the same time power consumption can be reduced. That is, when the clutches are both of the normally-open type, the clutches must be kept energized so long as the rear wheel turning system is in the normal state, and accordingly power consumption is increased. On the other hand, though the power consumption can be greatly reduced when the clutches are both of the normally-closed type, both the clutches are simultaneously disabled and cannot disengage when the power source for the clutches fails.

DESCRIPTION OF THE PREFERRED EMBODIMENTS

Figure 1:
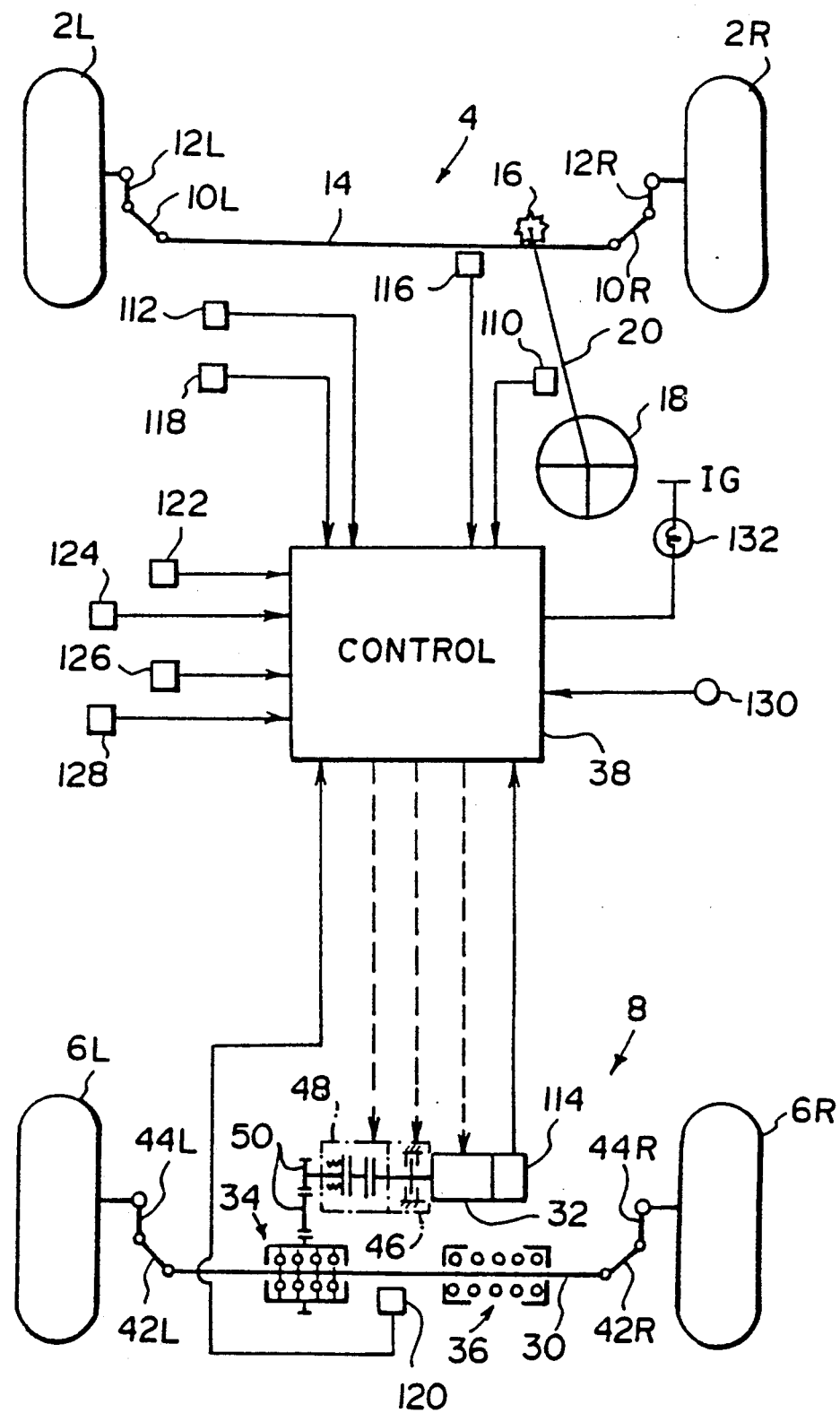
FIG. 1 is a schematic plan view of a four wheel steering system in which a rear wheel turning system in accordance with an embodiment of the present invention is employed.

In FIG. 1, a four-wheel steered vehicle is provided with a front wheel turning mechanism 4 for turning left and right front wheels 2L and 2R and a rear wheel turning mechanism 8 for turning left and right rear wheels 6L and 6R in accordance with an embodiment of the present invention.

The front wheel turning mechanism 4 comprises a front wheel turning rod 14 provided with a rack (not shown in FIG. 1) in mesh with a pinion 16 on the lower end of a steering shaft 20. A steering wheel 18 is mounted on the upper end of the steering shaft 20. The left front wheel 2L is connected to the left end of the front wheel turning rod 14 by way of a left tie rod 10L and a left knuckle arm 12L, and a right front wheel 2R is connected to the right end of the front wheel turning rod 14 by way of a right tie rod 10R and a right knuckle arm 12R. When the steering wheel 18 is rotated, the front wheel turning rod 14 is displaced in the transverse direction of the vehicle body and turns the front wheels 2L and 2R.

Figure 2:
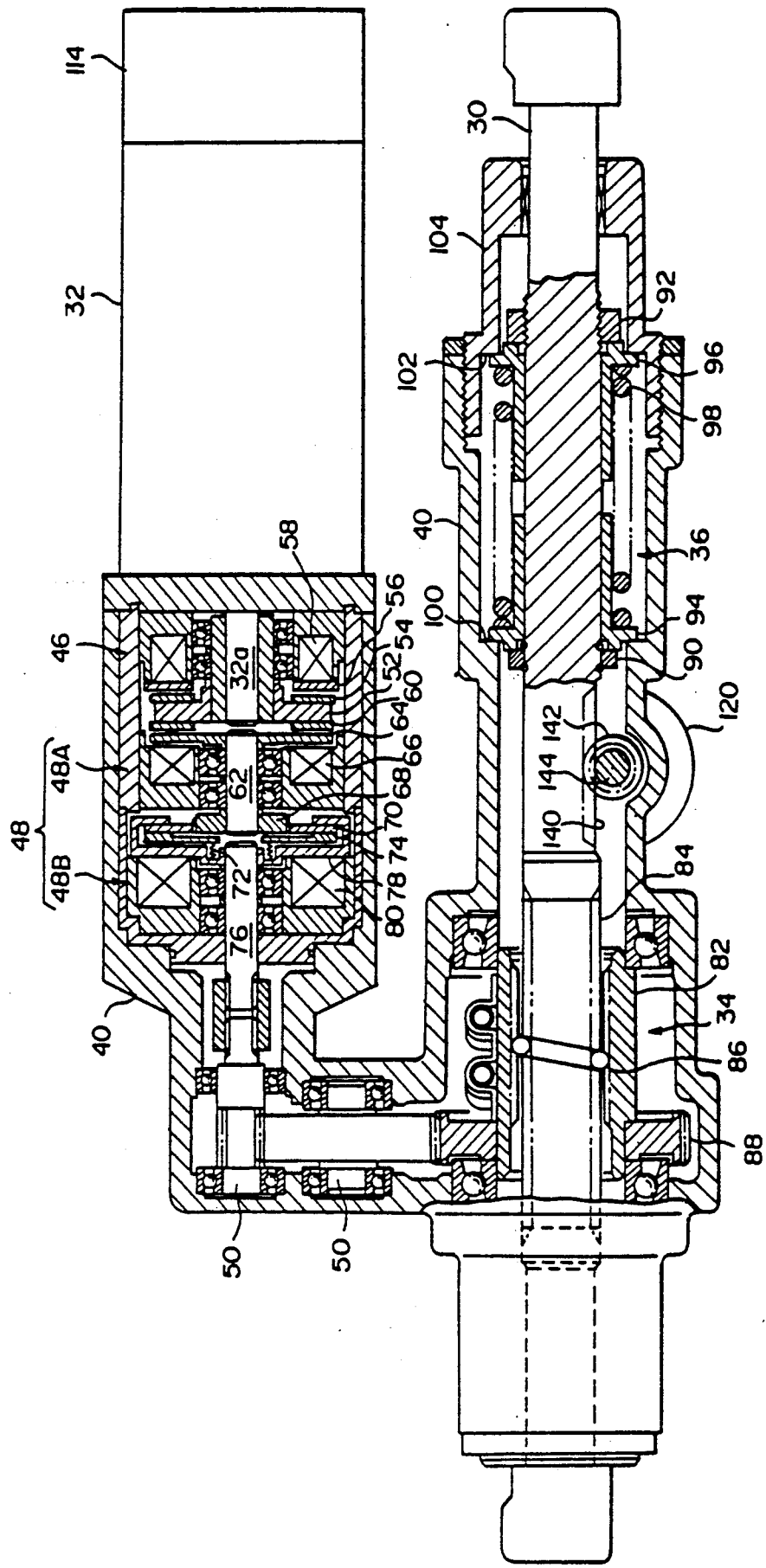
FIG. 2 is a cross-sectional view showing the rear wheel turning system in detail.

The rear wheel turning mechanism 8 comprises a rear wheel turning rod 46, a servomotor 32, a ball-screw means 34, which is rotated by the servomotor 32 and displaces the rear wheel turning rod 46 in the transverse direction of the vehicle body, a rear-wheel-neutralizing mechanism 36 which urges the rear wheel turning rod 46 to the neutral position and a control unit 38 which controls the servomotor 32. As shown in FIG. 2, the rear wheel turning rod 46, the ball-screw means 34, the rear-wheel-neutralizing mechanism 36 and the like are accommodated in a housing 40 fixed to the vehicle body (not shown).

The rear wheel turning rod 46 extends in the transverse direction of the vehicle body. The left rear wheel 6L is connected to the left end of the rear wheel turning rod 46 by way of a knuckle arm 44L and a tie rod 42L, and the right rear wheel 6R is connected to the right end of the rear wheel turning rod 46 by way of a knuckle arm 44R and a tie rod 42R so that the left and right rear wheels 6L and 6R are turned in response to displacement of the rear wheel turning rod 46 in the transverse direction of the vehicle body.

The rear wheel turning rod 46 is displaced in the transverse direction of the vehicle body by the servomotor 32. The servomotor 32 is a stepping motor and, as shown in FIG. 2, has an output shaft 32a which is connected to the rear wheel turning rod 46 by way of a driving force transmitting system comprising a brake 46, a double clutch mechanism 48, a reduction gear train 50 and a ball screw-means 34. The servomotor 32 is controlled by a control signal coming from the control unit 38 and displaces the rear wheel turning rod 46 in the transverse direction of the vehicle body from the neutral position, thus overcoming the force of the rear-wheel-neutralizing mechanism 36.

The brake 46 is under the control of the control unit 38 and holds the rear wheel turning rod 46 in a predetermined position by locking the driving force transmitting system between the servomotor 32 and the rear wheel turning rod 46. While the steering wheel 18 is fixed, that is, when the target turning angle of the rear wheels is fixed, the rear wheel turning rod 46 should be held in a predetermined position. When the rear wheel turning rod 46 is fixed by the brake 46, the power consumption is reduced compared to when it is fixed by the servomotor 32.

The double clutch mechanism 48 cuts the driving force transmitting system between the servomotor 32 and the rear wheel turning rod 46 and disconnects the rear wheel turning rod 46 from the servomotor 32 under the control of the control unit 38 in case the system fails as will be described in detail later, thereby permitting the rear wheel turning rod 46 to return to the neutral position under the force of the rear-wheel-neutralizing mechanism 36.

FIG. 2 shows the brake 46 and the double clutch mechanism 48 in detail.

As shown in FIG. 2, the brake 46 comprises a ring plate 54 having a plurality of radial grooves which are adapted so that they mesh with a plurality of radial grooves formed on the servomotor side surface of a disk 52, which is fixed to the output shaft 32a of the servomotor 32, and a solenoid 58 which pulls the ring plate 54 against an attracting plate 56 fixed to the housing 40. The disk 52 is also provided with a plurality of radial grooves on the other surface. When the solenoid 58 is not energized, the ring plate 54 freely rotates together with the disk 52. On the other hand, when the solenoid 58 is energized, the ring plate 54 is pulled against the attracting plate 56. Since the ring plate 54 is in mesh with the disk 52, the rotation of the output shaft 32a of the servomotor 32 is braked, and the output shaft 32a is locked.

The double clutch mechanism 48 comprises a pair of electro-magnetic clutches 48A and 48B disposed in series with each other. The clutch 48A nearer to the servomotor 32 is a normally-open type and the other clutch 48B is a normally-closed type. The normally-open type of clutch 48A comprises a ring plate 60 having a plurality of radial grooves adapted so that they mesh with the radial grooves on the surface of the disk 52 opposite to the surface facing the ring plate 54 of the brake 46, and a solenoid 66 which pulls the ring plate 60 against a disk 64 fixed to a rotational shaft 62. The rotational shaft 62 is coaxial with the output shaft 32a. When the solenoid 66 is not energized, the ring plate 60 is disengaged from the disk 64, and on the other hand, when the solenoid 66 is energized, the ring plate 60 is engaged with the disk 64, which operatively connects the rotational shaft 62 with the output shaft 32a of the servomotor 32. The ring plate 60 is constantly engaged with the disk 52. The normally-closed type of clutch 48B comprises a ring plate 70 which is connected by way of splines to a hub 68 fixed to the rotational shaft 62, a pad 74 which abuts against the side of the ring plate 70 remote from the servomotor 32 and pushes the ring plate 70 toward the servomotor 32 under the force of a spring 72, a drum 78 which is fixedly provided on a rotational shaft 76 coaxial with the rotational shaft 62 and is adapted so that it abuts against the side of the ring plate 70 facing the servomotor 32 and limits the displacement of the ring plate 70 toward the servomotor 2 to a predetermined amount, and a solenoid 80 which, when energized, pulls the pad 74 away from the ring plate 70. When the solenoid 80 is not energized, the ring plate 70 and the drum 78 are engaged with each other in face-to-face contact so that the rotation of the rotational shaft 62 is transmitted to the rotational shaft 76. On the other hand, when the solenoid 80 is deenergized, the pad 74 is pulled away from the ring plate 70, and accordingly, the ring plate 70 is disengaged from the drum 78.

Accordingly, the rotation of the output shaft 32a of the servomotor 32 is transmitted to the ball-screw means 34 only when the brake 46 is released and both the normally-open type of clutch 48A and the normally-closed type of clutch 48b are engaged (i.e., the solenoid 66 of the former clutch 48A is energized and the solenoid 80 of the latter clutch 48B is de-energized). Normally the rear wheels are turned in response to the operation of the steering wheel 18 with the driving force transmitting system in this state.

As shown in FIG. 2, the ball-screw means 34 comprises a ball nut 82, a ball thread 84 cut on the rear wheel turning rod 30 and balls 86 interposed between the ball nut 82 and the ball thread 84. The ball nut 82 is fixed to a gear 88 which is in mesh with the reduction gear train 50. The ball nut 82 cannot be displaced in the longitudinal direction of the rear wheel turning rod 30 though it can rotate together with the gear 88. With this arrangement, the rear wheel turning rod 30 is displaced in the longitudinal direction thereof in response to the rotation of the output shaft 32a of the servomotor 32.

The rear-wheel-neutralizing mechanism 36 includes a pair of stoppers 90 and 92 disposed on the rear wheel turning rod 30 at a predetermined distance from each other. A pair of spring retainers 94 and 96 are slidably fitted on the rear wheel turning rod 30 between the stoppers 90 and 92, and a compression spring 98 is compressed between the spring retainers 94 and 96. The rear wheel turning rod 30 extends through the compression spring 98. A pair of stoppers 100 and 102 are formed on the inner side of the housing 40. The spring retainer 94 abuts against both the stopper 90 on the rear wheel turning rod 30 and the stopper 100 on the housing 40 under the force of the compression spring 98, and the spring retainer 96 abuts against both the stopper 92 on the rear wheel turning rod 30 and the stopper 102 on the housing 40 under the force of the compression spring 98, whereby the distance between the spring retainers 94 and 96 is limited. The stopper 92 is screwed on the rear wheel turning rod 30 and the stopper 102 is formed on a cap member 104 which is screwed in the housing 40. Accordingly, the preset load on the compression spring 98 is increased when the stopper 92 and the cap member 104 are tightened and is reduced when they are loosened. The rear wheel turning rod 30 is urged by the spring 98 having such a preset load to the neutral position in which the rear wheels 6L and 6R are held in the straightahead position (the position in which the turning angle of the rear wheels is 0). The preset load of the compression spring 98 should be set so that the compression spring 98 can overcome the maximum side force acting on the rear wheel turning rod 30 during cornering.

As shown in FIG. 1, the control unit 38 controls the rear wheel turning mechanism 8 according to the running condition of the vehicle on the basis of predetermined four-wheel steering characteristics.

Figure 3:
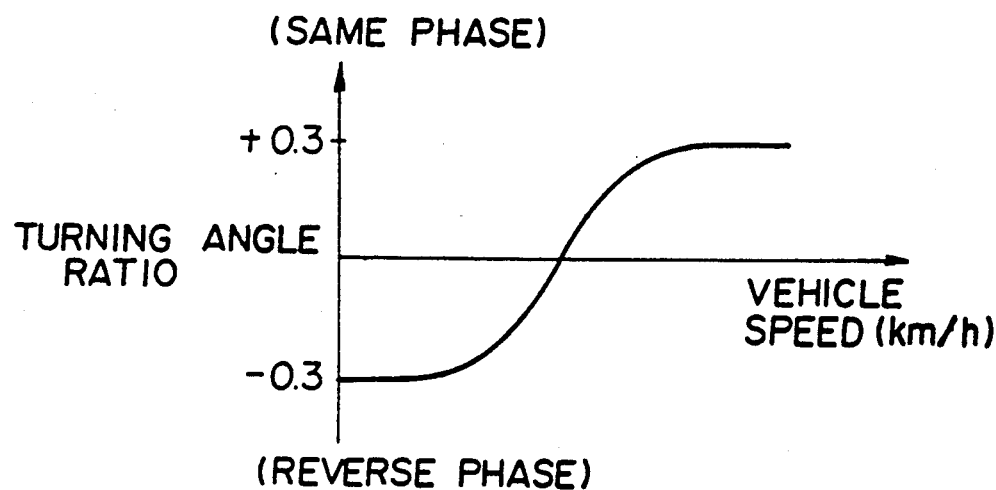
FIGS. 3 and 4 illustrate the operation of the four wheel steering system shown in FIG. 1.
Figure 4:
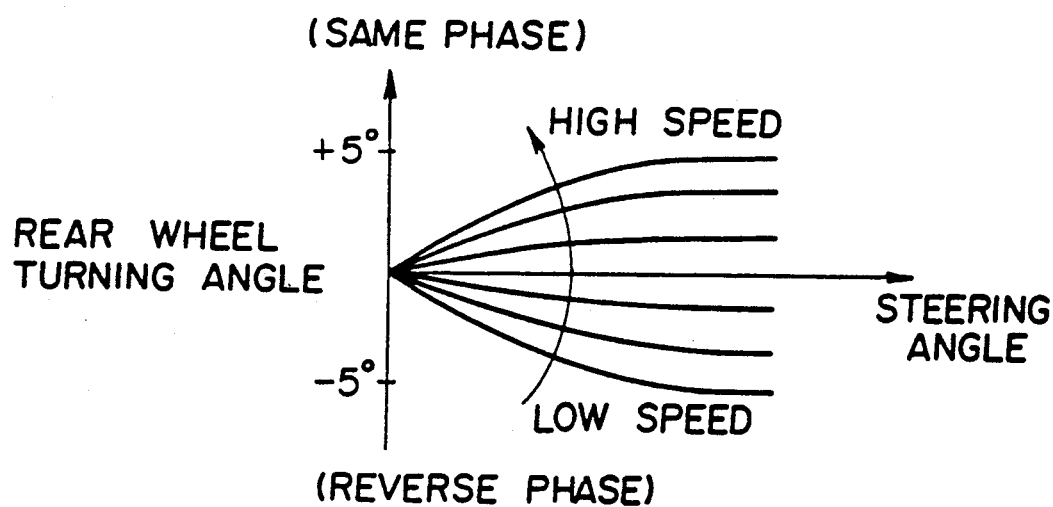

In this embodiment, the control unit 38 controls the rear wheel turning mechanism 8 so that the rear wheel turning angle ratio, i.e., the ratio of the turning angle of the rear wheels to the ratio of the turning angle of the front wheels, is changed according to the vehicle speed and the turning angle of the steering wheel 18 on the basis of the four-wheel steering characteristics shown in FIGS. 3 and 4. In FIGS. 3 and 4, the rear wheel turning angle ratio is defined to be positive when the rear wheels are turned in the same direction as the front wheels (same phase) and to be negative when the rear wheels are turned in the direction opposite to that of the front wheels (reverse phase).

The control unit 38 receives signals from a steering angle sensor 110, a vehicle speed sensor 112 and a rotary encoder 114, which detects the angular position of the servomotor 32, and determines a target rear wheel turning angle on the basis of the steering angle (equivalent to the front wheel turning angle) and the vehicle speed. Then the control unit 38 outputs a control signal to the servomotor 32, which control signal represents the amount by which the rear wheels are to be turned, and the rotary encoder 114 watches whether the servomotor 32 is correctly operated.

The control unit 38 controls the brake 46 and the double clutch mechanism 48 in addition to the servomotor 32.

The control unit 38 causes the brake 46 to lock the output shaft 32a of the servomotor 32, thereby holding the rear wheel turning rod 30 in a predetermined position corresponding to the target rear wheel turning angle so long as the rear wheel turning system is normal. In case the rear wheel turning system fails, the control unit 38 disengages the double clutch mechanism 48 so as to permit the rear wheel turning rod 30 to return to the neutral position under the force of the compression spring 98. The control unit 38 may be arranged such that it disengages both clutches 48A and 48B or one of the clutches 48A or 48B in case the rear wheel turning system fails.

The control system of the four wheel steering system of this vehicle is doubly arranged for the purpose of safety. That is, a front wheel turning angle sensor 116 is provided in addition to the steering angle sensor 110, and a second vehicle speed sensor 118 is provided in addition to the vehicle speed sensor 112. Further, a rear wheel turning angle sensor 120 which detects the rear wheel turning angle from the displacement of the rear wheel turning rod 30 is provided in addition to the rotary encoder 114. The rear wheels 6L and 6R are turned only when both the sensors in each of the three sensorsensor pairs detect values conforming to each other. For example, when the value of the vehicle speed detected by the first vehicle speed sensor 112 differs from that detected by the second vehicle speed sensor 118, it is determined that a failure has occurred and control (to be described in detail later) is accomplished by a failure mode, which holds the rear wheels 6L and 6R in the straight-ahead position.

A neutral switch 122, an inhibitor switch 124, a brake switch 126 and an engine switch 128 are connected to the control unit 38. A signal representing whether or not an alternator (not shown) is generating electricity is input into the control unit 38 from an L-terminal 130 of the alternator.

The rear wheel turning angle sensor 120 comprises a potentiometer which is mounted on a shaft 144 of a pinion 142 in mesh with a rack 140 formed on the rear wheel turning rod 30 and detects the amount of rotation of the shaft 144.

In this particular embodiment, a first measure mode or a second measure mode is taken according to the kind of failure which occurs.

The first measure mode is taken in the case of a failure such as one that disables the control of the rear wheels 6L and 6R by the servomotor 32, e.g., a failure in the servomotor 32, the control unit 38, the rotary encoder 114 or the like. (Such a failure will be referred to as "a first mode failure", hereinbelow.) In the first measure mode, the double clutch mechanism 48 is disengaged and the rear wheels are returned to the straight-ahead position under the force of the compression spring 98.

The second measure mode is taken in the case of a failure such as one that does not permit correct control of the four-wheel steering but permits turning of the rear wheels and detection of the position of the rear wheels, e.g., a failure in the sensors for detecting the vehicle speed or in the sensors for detecting the steering wheel turning angle. (Such a failure will be referred to as "a second mode failure", hereinbelow.) In the second measure mode, the rear wheels are turned to the straight-ahead position by the servomotor 32.

Figure 5:
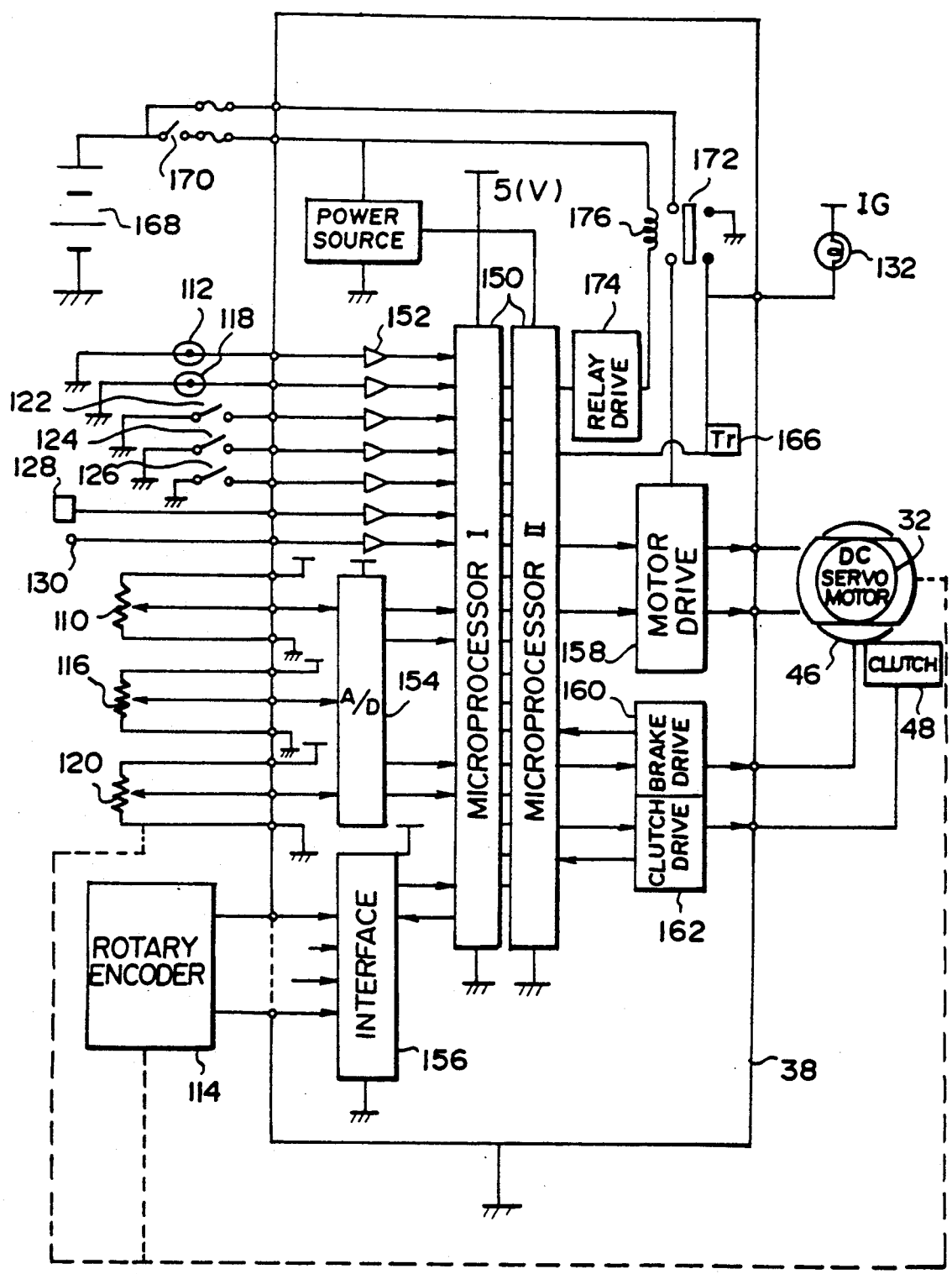
FIG. 5 is a block diagram showing the control unit employed in the embodiment.

As shown in FIG. 5, the control unit 38 has a double microprocessor 150 comprising microprocessors I and II. The signals from the vehicle speed sensors 112 and 118, the switches 122, 124, 126 and 128, and the L-terminal 130 of the alternator are input into the microprocessor 150 by way of buffers 152. The signals from the sensors 110, 116 and 120 are input into the microprocessor 150 by way of an A/D convertor 154, and the signal from the rotary encoder 114 is input into the microprocessor 150 by way of an interface 156. The microprocessor 150 generates signals and delivers them to the servomotor 32, the brake 46 and the double clutch mechanism 48, respectively, by way of a motor driving circuit 158, a brake driving circuit 160 and a clutch driving circuit 162. The control of the turning of the rear wheels is begun when the signal from the L-terminal 130 of the alternator turns high. Reference numeral 132 denotes an alarm lamp which is lit when a failure occurs and the microprocessor 150 provides a current to the base of a transistor 166. Reference numerals 168 and 170 in FIG. 5 respectively denote a battery and an ignition switch, and reference numeral 172 denotes a relay having a relay winding 176. The relay winding 176 is connected between the ignition switch 170 and a relay driving circuit 174, which is connected to the microprocessor 150. When said first mode failure occurs, the relay driving circuit 174 de-energizes the relay winding 176, whereby the motor driving circuit 158 is disconnected from the battery 168 and an alarm lamp 132 is lit irrespective of existence of the base current of the transistor 166.

Figure 6:
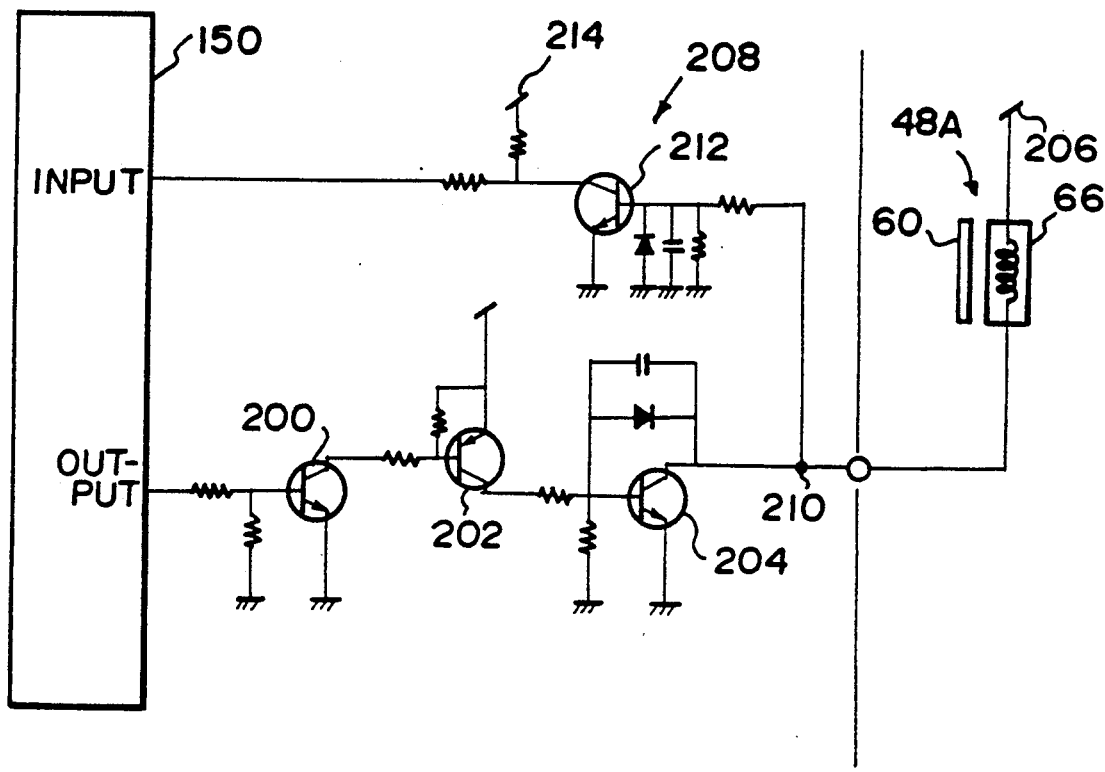
FIG. 6 shows a part of the clutch driving circuit of the control unit.

FIG. 6 shows the part of the clutch driving circuit 162 for driving the normally-open type of clutch 48A.

A high level control signal for causing the clutch 48A to engage or a low level control signal for causing the clutch 48A to disengage is output from the output section of the microprocessor 150. When the high level control signal is output, all transistors 200, 202 and 204 are turned on. When the transistor 204 is turned on, an electric current flows through the solenoid 66 of the clutch 48A from a power source 206, and the ring plate 60 is pulled against the disk 64, whereby the clutch 48A is engaged. When the low level control signal is output, the transistors 200, 202 and 204 are turned off and the clutch 48A is disengaged.

Further, a monitor circuit 208 is provided in the part of the clutch driving circuit 162 which drives the normally-open type of clutch 48A. The monitor circuit 208 is connected between a predetermined point 210 on the line between the transistor 204 and the solenoid 66 and the input section of the microprocessor 150 and includes a transistor 212. When the high level control signal is output from the output section and the solenoid 66 is energized, the predetermined point 210 is low, and the transistor 212 is off. Accordingly, when the solenoid 66 is energized, a high level signal, the value of which is based on the voltage of a power source 214, is input into the input section of the microprocessor 150. On the other hand, when the low level control signal is output from the output section and the solenoid 66 is de-energized, the predetermined point 210 is high, and the transistor 212 is on. Accordingly, when the solenoid 66 is de-energized, a low level signal is input into the input section of the microprocessor 150.

As shown in Fiugure 7A, the microprocessor 150 outputs a low level signal for 0.1 second at intervals of 10 seconds and outputs a high level control signal the rest of the time in order to cause the clutch 48A to engage. With this arrangement, a failure in the power source 206, or break of the solenoid 66 or the line for energizing the solenoid 66 can be detected. That is, the predetermined point 210 is low both in the case of a high level control signal being output from the microprocessor 150 and in the case of the power source 206 failing, for instance. Accordingly, if a high level control signal is continuously output, a high level signal is continuously input into the input section of the microprocessor 150 irrespective of the existence of a failure, and accordingly, a failure in the power source 206, the solenoid 66 and the like cannot be detected. On the other hand, when the control signal is inverted at intervals, the signal input into the input section of the microprocessor 150 is inverted in response to the inversion of the control signal so long as the power source 206, the solenoid 66 and the like are normal. Accordingly, if the signal input into the input section of the microprocessor 150 remains high irrespective of the level of the control signal, some failure has occurred. The clutch 48A cannot be disengaged even if a low level control signal is output so long as the duration of the low level control signal is sufficiently short.

Figure 7A:
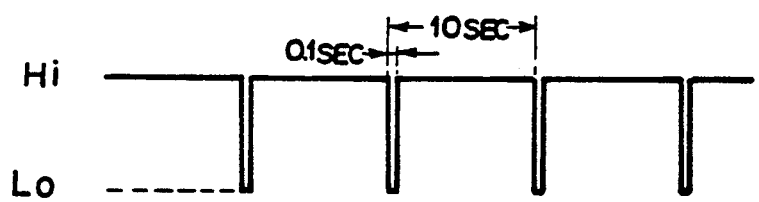
FIGS. 7A and 7B show the clutch control signals.
Figure 7B:
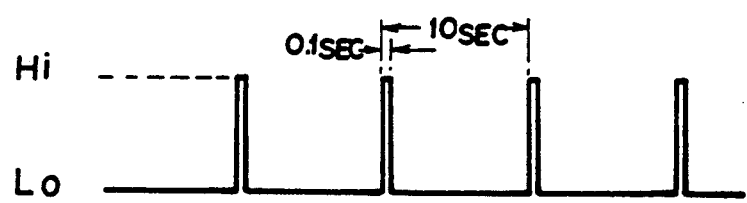

The part of the clutch driving circuit 162 which drives the normally-closed type of clutch 48B may be the same as the part shown in FIG. 6 except that a low level control signal is output when the clutch 48B is to be engaged and a high level control signal is output when the clutch 48B is disengaged. Further, in the case of the part of the clutch driving circuit 162 which drives the normally-closed type of clutch 48B, the control signal is inverted for 0.1 second at intervals of 10 seconds as shown in FIG. 7B. With this arrangement, a failure in one of the transistors 200, 202 or 204 can be detected. That is, the predetermined point 210 is high both in the case where a low level control signal is output from the microprocessor 150 and in the case where one of the transistors 200, 202 or 204 fails. Accordingly, if a low level control signal is continuously output, a low level signal is continuously input into the input section of the microprocessor 150 irrespective of the existence of a failure, and accordingly, a failure in the transistors cannot be detected. On the other hand, when the control signal is inverted at intervals, the signal which is input into the input section of the microprocessor 150 is inverted in response to the inversion of the control signal so long as all the transistors are normal. Accordingly, if the signal input into the input section of the microprocessor 150 remains low irrespective of the level of the control signal, some failure has occurred.

The motor driving circuit 158 and the brake driving circuit 160 are provided with similar monitor circuits.

Figure 8:
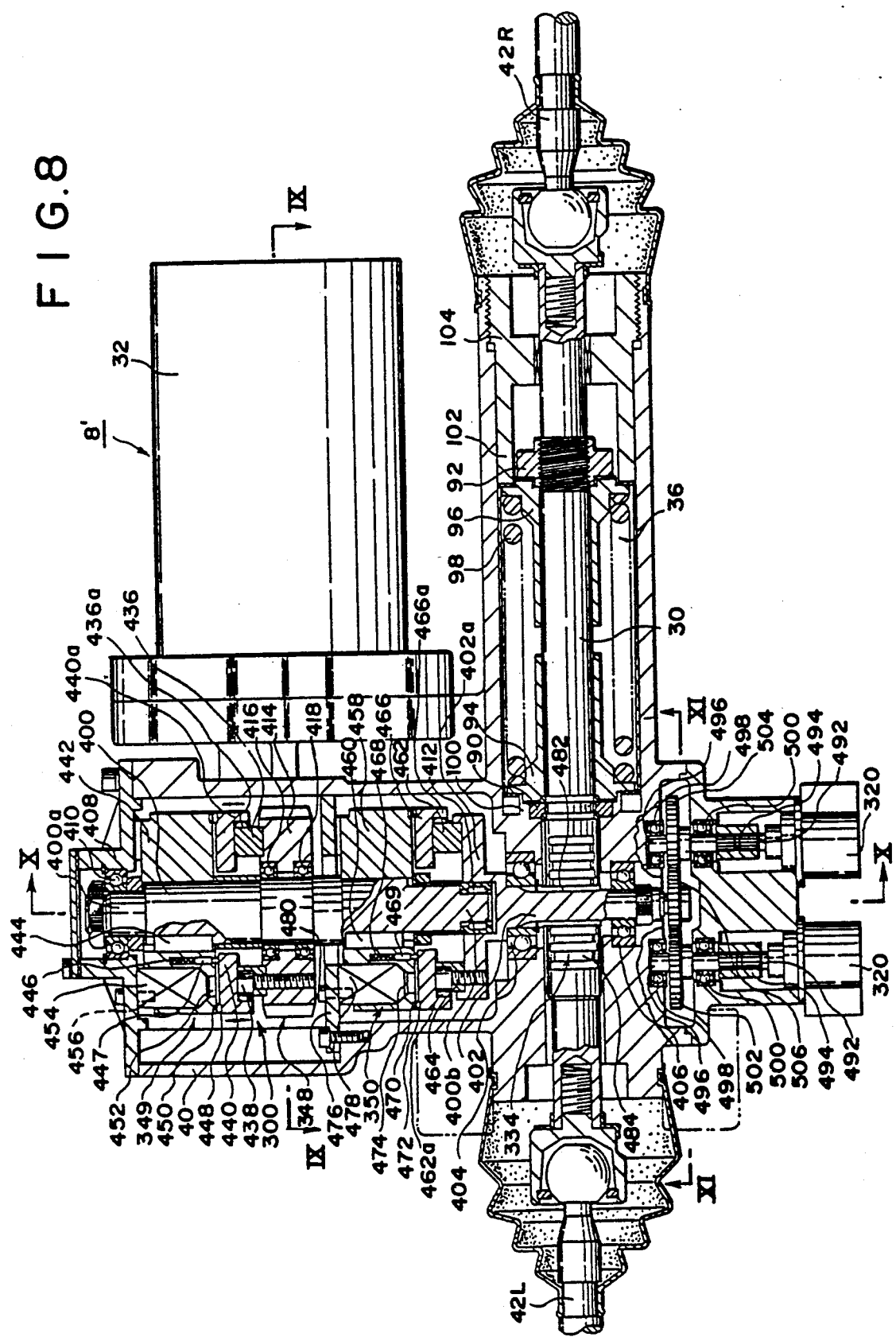
FIG. 8 is a cross-sectional view showing a rear wheel turning system in accordance with another embodiment of the present invention.

FIG. 8 shows a rear wheel turning mechanism in accordance with another embodiment of the present invention. In FIG. 8, the parts analogous to those shown in FIG. 2 are given the same reference numerals and will not be described in detail here. The rear wheel turning mechanism 8' of this embodiment comprises a rear wheel turning rod 30, a rear-wheel-neutralizing mechanism 36, a servomotor 32 and a driving force transmitting mechanism 300 which transmits the output of the servomotor 32 to the rear wheel turning rod 30.

The driving force transmitting mechanism 300 comprises a worm gear mechanism 348 connected to the output shaft of the servomotor 32, a rack-and-pinion mechanism 334 provided on the rear wheel turning rod 30 and a pair of clutch mechanisms 349 and 350 which are provided in series between the worm gear mechanism 348 and the pinion-and-rack mechanism 334.

Rotational shafts 400 and 402 are rotatably mounted in the housing 40 coaxially with each other. The rotational shaft 402 is supported for rotation by a pair of bearing portions 404 and 406 formed in the housing 40. An end 400a of the rotational shaft 400 is supported for rotation by a bearing portion 410 formed on a cap plate 408 of the housing 40, and the other end 400b is supported for rotation by a bearing portion 412 formed on an end portion 402a of the rotational shaft 402.

Figure 9:
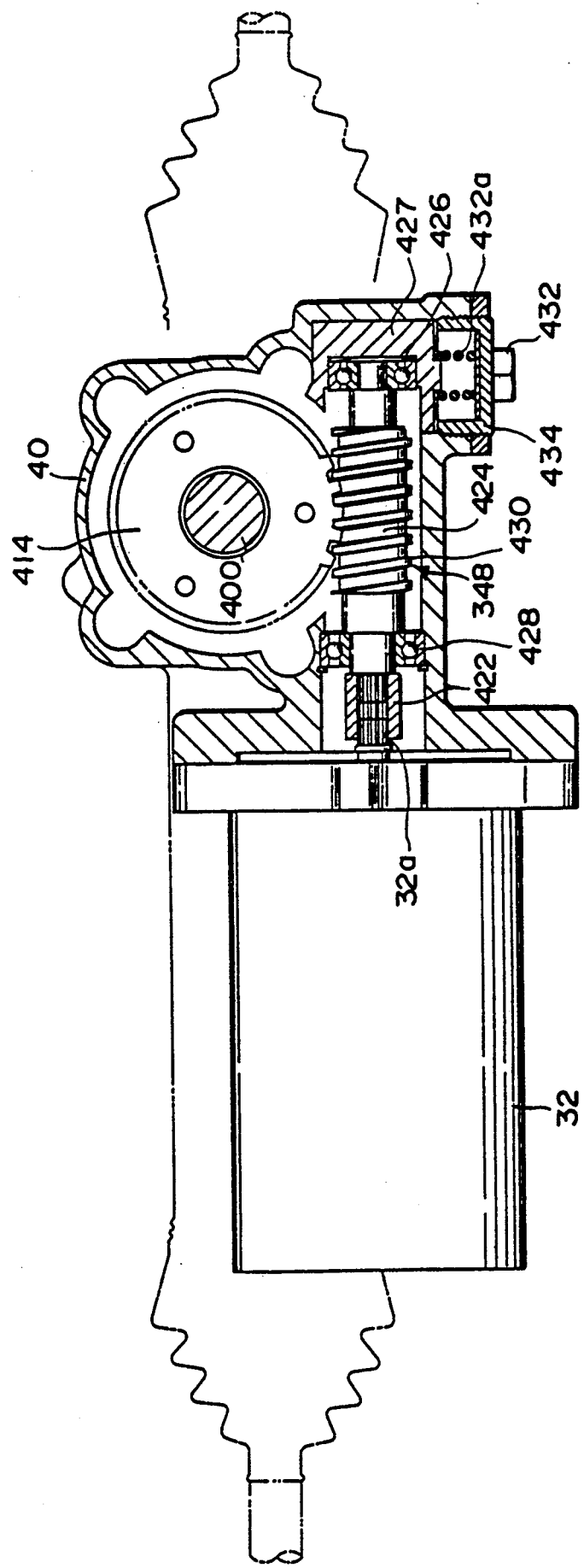
FIG. 9 is a cross-sectional view taken along line IX—IX in FIG. 8.

The worm gear mechanism 348 comprises a worm wheel 414 which is supported for rotation on bearing portions 416 and 418 provided on the shaft 400. The output shaft 32a (FIG. 9) of the servomotor 32 is connected to a worm shaft 424 by a spline connection ring 422. The worm shaft 424 is provided with a worm 430 at an intermediate portion thereof and is supported for rotation by bearing portions 426 and 428 at opposite ends thereof. The worm 430 is in mesh with the worm wheel 414, and the worm wheel 414 is rotated in response to the rotation of the output shaft 32a of the servomotor 32.

The spline connection ring 422 accommodates a displacement of the output shaft 32a and the worm shaft 424 in the longitudinal direction thereof relative to each other. The bearing portion 426 is held by a holder 427 which is received in the housing the 40. The holder 427 is connected to an adjustment member 432 by way of a a spring 432a, and the adjustment member 432 is screwed in a cap member 434 of the housing 40 so that the meshing condition of the worm 430 and the worm wheel 414 can be adjusted by a rotation of the adjustment member 432.

The first clutch mechanism 349 includes a first annular member 436 which is fixed to the worm wheel 414 by bolts 438. The first annular member 436 is provided with a splined portion 436a on the outer peripheral surface. A second annular member 440 has a splined portion 440a on the inner peripheral surface and is disposed coaxially with the first annular member 436, with the splined portions 436a and 440a being in mesh with each other. Accordingly, the second annular member 440 can be moved relative to the first annular member 436 in the axial direction and can be rotated by being driven by the first annular member 436.

A clutch member 442 is fixed to the rotational shaft 400 by means of a fixing piece 444 and the rotational shaft 400 is rotated when the clutch member 442 rotates. In the clutch member 442 a spring 446 and a contact piece 447 are provided. The spring 446 urges the clutch member 442 away from the second annular member 440 so that the rotation of the second annular member 440 is not transmitted to the clutch member 442. The second annular member 440 and the clutch member 442 are respectively provided with a projection 448 and a recess 450 on respective opposed sides, and the rotation of the second annular member 440 is transmitted to the clutch member 442 when the projection 448 of the second annular member 440 is brought into engagement with the recess 450 of the clutch member 442.

An annular recess 452 is formed on the side of the clutch member 442 opposite to the side on which the recess 450 is formed, and a plurality of solenoids 454 are fixed to the cap plate 408 of the housing 40 by bolts 456 and are angularly spaced from each other. The solenoids 454 are received in the annular recess 452. When the solenoids 454 are energized, the second annular member 440 is pulled against the clutch member 442 overcoming the force of the spring 446, and the projection 448 of the second annular member 440 is brought into engagement with the recess of 450 of the clutch member 442, whereby the rotation of the second annular member 440 comes to be transmitted to the clutch member 442. In other words, the first clutch mechanism 349 is engaged.

The second clutch mechanism 350 includes a third annular member 462 which is fixed to the rotational shaft 402 by bolts 464. The third annular member 462 is provided with a splined portion 462a on the outer peripheral surface. A fourth annular member 466 has a splined portion 466a on the inner peripheral surface and is disposed coaxially with the third annular member 462, with the splined portions 462a and 466a being in mesh with each other. Accordingly, the fourth annular member 466 can be moved relative to the third annular member 462 in the axial direction and can drive the third annular member 462.

A clutch member 458 is fixed to the rotational shaft 400 by means of a fixing piece 460 and the clutch member 458 is rotated when the rotational shaft 400 rotates. In the clutch member 458 a spring 468 and a contact piece 469 are provided. The spring 468 urges the fourth annular member 466 away from the clutch member 458 so that the rotation of the clutch member 458 is not transmitted to the fourth annular member 466. The fourth annular member 466 and the clutch member 458 are respectively provided with a projection 472 and a recess 470 on respective opposed sides, and the rotation of the clutch member 458 is transmitted to the fourth annular member 466 when the projection 472 is brought into engagement with the recess 470.

An annular recess 474 is formed on the side of the clutch member 458 opposite to the side on which the recess 470 is formed, and a plurality of solenoids 478 are fixed to a holder plate 476 of the housing 40 by bolts 480 and are angularly spaced from each other. The solenoids 478 are received in the annular recess 474. When the solenoids 478 are energized, the fourth annular member 466 is pulled against the clutch member 458 overcoming the force of the spring 468, and the projection 472 of the fourth annular member 466 is brought into engagement with the recess of 470 of the clutch member 458, whereby the rotation of the clutch member 458 comes to be transmitted to the fourth annular member 466. In other words, the second clutch mechanism 350 is engaged.

The rack-and-pinion mechanism 334 comprises a pinion 482 which is formed on a portion of the rotational shaft 402 between the bearing portions 404 and 406 and a rack 484, which is formed on the rear wheel turning rod 30 and is in mesh with the pinion 482. The rotation of the rotational shaft 402 is converted into a displacement of the rear wheel turning rod 30 in the longitudinal direction thereof by the rack-and-pinion mechanism 334.

Figure 10:
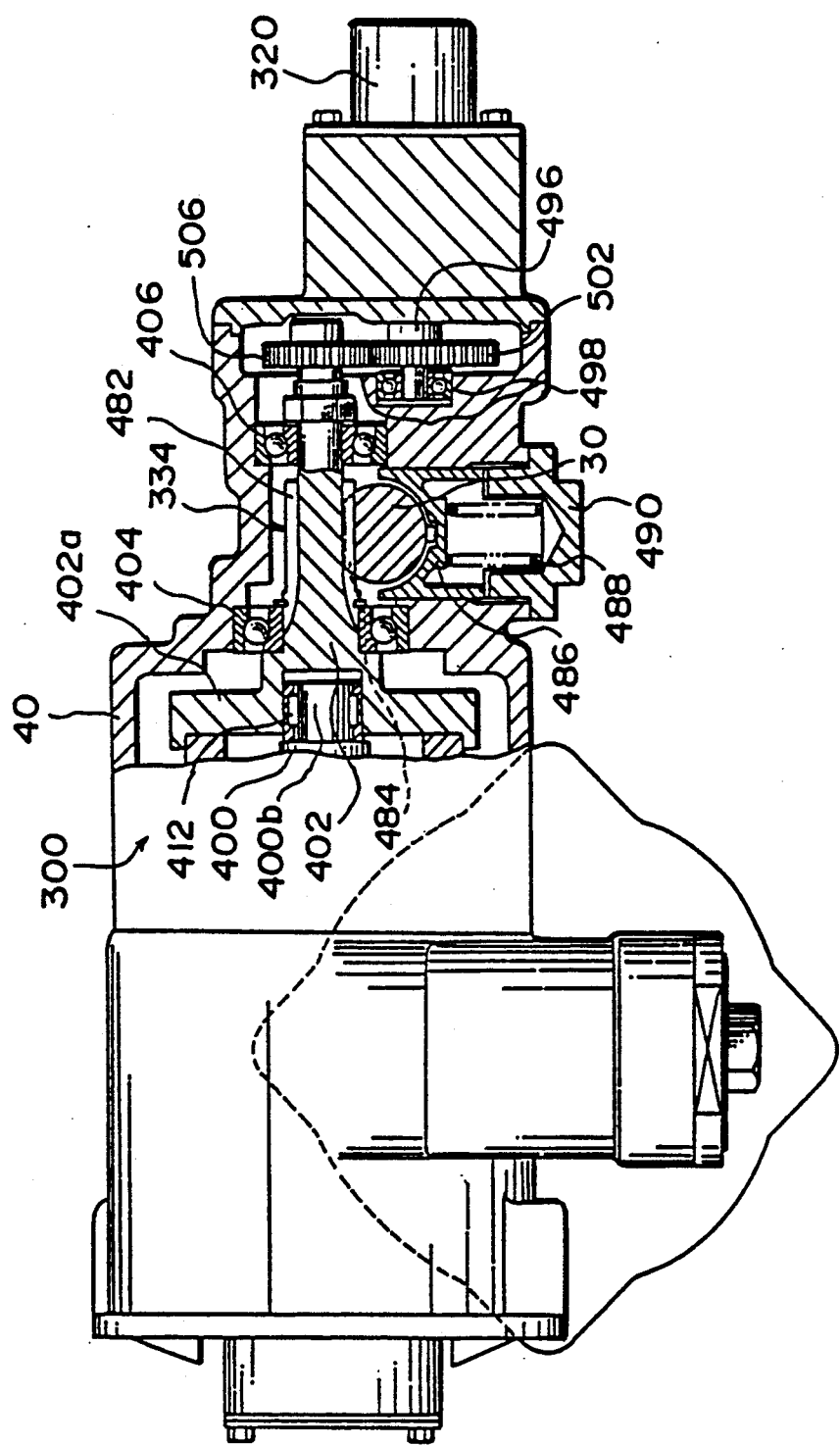
FIG. 10 is a cross-sectional view take along line X—X in FIG. 8.
Figure 11:
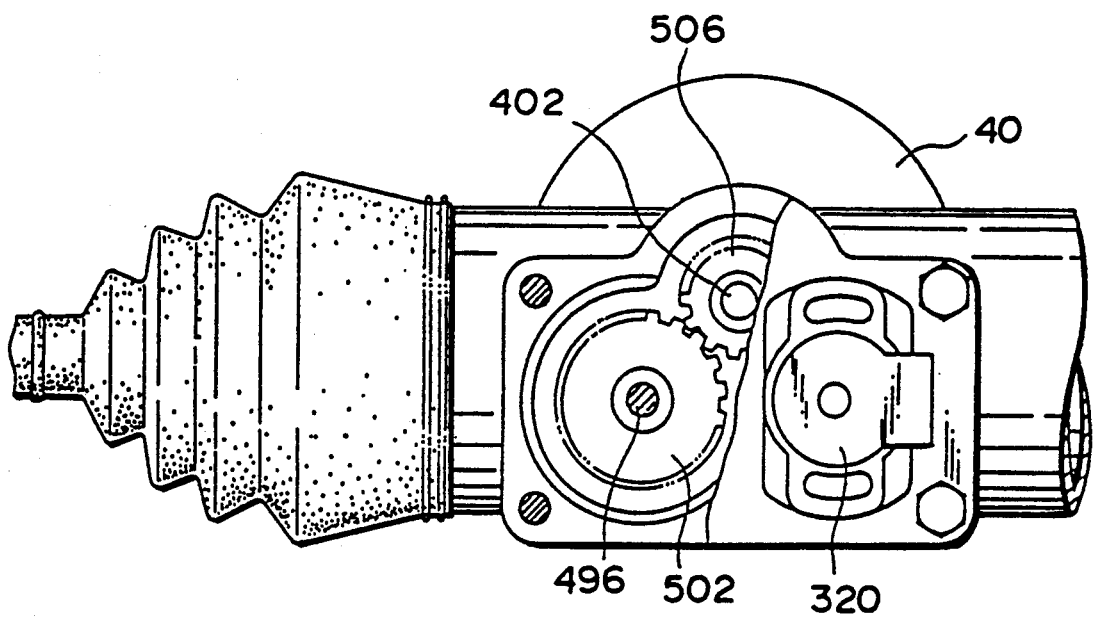
FIG. 11 is a cross-sectional view take along line XI—XI in FIG. 8.

The part of the rear wheel turning rod 30 at which the rack 484 is formed is supported by a bearing portion 486 (FIG. 10). The bearing portion 486 is connected to an adjustment member 490 by way of a spring 488, and the adjustment member 432 is screwed into the housing 40 so that the meshing condition of the rack 484 and the pinion 482 can be adjusted by a rotation of the adjustment member 490.

Each of a pair of rear wheel turning angle sensors 320 has a detecting shafts 492. Each detecting shaft 492 is connected to a shaft 496 by way of a spline connection ring 494. Each of the shafts 496 is supported for rotation by a pair of bearing portions 498 and 500. Gears 502 and 504 are fixed to the respective shafts 496 between the bearing portions 498 and 500. A gear 506 (FIG. 10) is fixed to the end of the rotational shaft 402, and the gear 506 is in mesh with both gears 502 and 504.

Accordingly, when the rotational shaft 402 is rotated and the rear wheels are turned, the shafts 496 are rotated because gears 506, 502 and 504 are in mesh, whereby the rotation of the rotational shaft 402 is detected by the rear wheel turning angle sensors 320.

Normally the first and second clutch mechanisms 349 and 350 are both engaged, that is, the solenoids 454 and 478 are both energized. When both the first and second clutch mechanisms 349 and 350 are engaged, the rotation of the output shaft 32a of the servomotor 32 is transmitted to the worm wheel 414 by way of the spline connection ring 422 and the worm shaft 424. The rotation of the worm wheel 414 is transmitted to the rotational shaft 400 by way of the annular members 436 and 440 and the clutch member 442. Further, the rotation of the rotational shaft 400 is transmitted to the rotational shaft 402 by way of the clutch member 458 and the annular members 466 and 462. Then the rotation of the shaft 402 is converted into the longitudinal displacement of the rear wheel turning rod 30 by the pinion 482 and the rack 484, whereby the rear wheels are turned. Further, the rotation of the shaft 402 is transmitted to the detecting shafts 492 of the rear wheel turning angle sensors 320 by way of the gears 506, 502 and 504, the shafts 296 and the spline connection rings 494.

In case the control system fails, the first and second clutches 349 and 350 are both disengaged, and the rear wheel turning rod 30 is returned to the neutral position by the rear-wheel-neutralizing mechanism 36. At this time, since a pair of clutch mechanisms are provided between the servomotor 32 and the rear wheel turning rod 30, the latter can be disconnected from the former when at least one of the clutches is successively disengaged. Further, in this particular embodiment since the clutch mechanisms are disposed so that the rear wheel turning rod 30 is disconnected from the worm gear mechanism when the clutches are disengaged, the worm gear mechanism does not act as a load on the rear-wheel-neutralizing mechanism 36.

We claim:

1. A rear wheel turning system for a vehicle comprising:
    a rear wheel turning member which is connected to rear wheels of the vehicle and turns the rear wheels,
    an electric motor which is operatively connected to the rear wheel turning member by way of a driving force transmitting system and to a steering wheel and displaces the rear wheel turning member, thereby causing the rear wheels to turn in response to an operation of the steering wheel,
    a rear-wheel-neutralizing means which urges the rear wheel turning member to a neutral position in which the rear wheels are held in a straight-ahead position, and
    a pair of clutch mechanisms which are provided in series in a driving path of the driving force transmitting system between the electric motor and the rear wheel turning member and are adapted such that they disconnect the latter from the former, which permits the latter to return to the neutral position under the force of the rear-wheel-neutralizing means,
    wherein said driving force transmitting system comprises a worm gear mechanism provided on an output shaft of the electric motor and a rack-and-pinion mechanism provided on the rear wheel turning member, and said clutch mechanisms are provided between the worm gear mechanism and the rack-and-pinion mechanism.

2. A rear wheel turning system as defined in claim 1 further comprising a failure detecting means which disengages the clutch mechanisms when it detects some failure in the rear wheel turning system.

3. A rear wheel turning system as defined in claim 2 in which one of said clutch mechanisms is a normally-closed type of electro-magnetic clutch mechanism which is engaged when it is not energized, and the other clutch mechanism is a normally-open type of electro-magnetic clutch mechanism which is engaged when it is energized.

4. A rear wheel turning system as defined in claim 3 in which the clutch mechanisms nearer to the electric motor is said normally-open type of electromagnetic clutch mechanism.

5. A rear wheel turning system as defined in claim 1 in which said pair of clutch mechanisms are of a normally-open type.

6. A rear wheel turning system as defined in claim 1 in which said worm gear mechanism comprises a worm gear provided on the output shaft of the electric motor and a worm wheel which is provided on a transmitting shaft extending perpendicular to the output shaft of the electric motor and is in mesh with the worm gear, and said rack-and-pinion mechanism comprises a rack which is formed on the rear wheel turning member and a pinion which is provided on the transmitting shaft and is in mesh with the rack, said pair of clutch mechanisms being provided on the transmitting shaft.

7. A rear wheel turning system as defined in claim 6 in which said worm wheel is supported for rotation on the transmitting shaft at substantially the middle of the transmitting shaft and said pair of clutch mechanisms are disposed on opposite sides of the worm wheel.

8. A rear wheel turning system as defined in claim 6 in which said pinion is formed on a portion of the transmitting shaft near the end opposed to the rear wheel turning member and the end of the transmitting shaft is connected to a rear wheel turning angle sensor.

9. A rear wheel turning system as defined in claim 8 in which a plurality of rear wheel turning angle sensors are connected to the end of the transmitting shaft by way of a gear mechanism.

10. A rear wheel turning system as defined in claim 2 in which said failure detecting means immediately disengages the clutch mechanisms when it detects a first kind of failure and disengages the same after the rear wheel turning rod is returned to the neutral position by the electric motor when it detects a second kind of failure.

* * * * *